United States Patent

[11] 3,602,502

| [72] | Inventor | Franz Hampl<br>Hochberg, Germany |
|---|---|---|
| [21] | Appl. No. | 30,050 |
| [22] | Filed | Apr. 20, 1970 |
| [45] | Patented | Aug. 31, 1971 |
| [73] | Assignee | Erich Jaegar<br>Wurzburg, Germany |

[54] MOVING BELT ERGOMETER WITH BRAKING ARRANGEMENT
8 Claims, 2 Drawing Figs.

[52] U.S. Cl. ................................................. 272/69
[51] Int. Cl. ................................................. A63b 23/06
[50] Field of Search ........................................ 272/69, 73;
198/184; 73/379

[56] References Cited
UNITED STATES PATENTS

| 3,395,698 | 8/1968 | Morehouse | 73/379 |
| 3,442,131 | 5/1969 | Leyten | 272/73 |
| 3,518,985 | 7/1970 | Quinton | 272/69 |

Primary Examiner—Richard C. Pinkham
Assistant Examiner—Richard Dror
Attorney—Spencer & Kaye ABSTRACT: A moving belt ergometer for physically stressing a living being having a walking surface in the form of an endless belt which can be inclined with respect to the horizontal and which is driven by a speed-controlled variable-speed electromotor. A braking arrangement is provided for the endless belt which is actuated whenever the force transmitted between the endless belt and the drive motor is such that the motor is being driven by the belt. Preferably, the electromotor is a shunt-connected DC motor provided with a thyristor-controlled dynamic braking arrangement which is responsive to the counter-EMF of the electromotor indicating that the electromotor is being driven as a generator.

3,602,502

INVENTOR.
Franz Hampl

Spencer & Kaye
BY              ATTORNEYS.

MOVING BELT ERGOMETER WITH BRAKING ARRANGEMENT

BACKGROUND OF THE INVENTION

The present invention relates to a moving belt ergometer for physically stressing a living being which ergometer is provided with a walking surface whose inclination with respect to the horizontal is adjustable and formed by an endless moving belt which can be driven at varying speeds by a drive means comprising an electromotor.

Two possibilities exit for changing the physical stress by means of the moving belt ergometer. These possibilities are (1) changing the drive speed of the moving belt (e.g. between 2 and 20 km./hr.) and (2) changing the inclination of the walking surface with respect to the horizontal (e.g. over a range of between 0° and 45°).

When the walking surface forms an angle other than 0° with the horizontal, the gravitational force of the living being or patient produces a force component directed parallel to the moving belt which force tends to drive the moving belt in the normal driving direction.

The known moving belt ergometers normally contain, as their drive mechanism for the moving belt, an AC motor with a relatively large power output and a variable-speed gear mechanism. The inherent friction of the gear mechanism is generally so large that the moving belt can not be driven by the gravitational force of the patient. This type of arrangement has the drawback, however, that a correspondingly large driving force, i.e., the AC motor, is required and consequently the ergometer can therefore no longer be connected to a common house outlet (maximum output 2.2 kw.).

The power required to drive the ergometer could be reduced by replacing the variable-speed gear mechanism with a simple reduction gear and utilizing a DC motor which is speed controlled, e.g. by means of a thyristor circuit, as the drive motor. Due to the low inherent friction of such a drive mechanism, however, there then exists the possibility, that the moving belt can be driven by the gravitational force of the patient which would lead to a continuous increase in the walking speed and to an undue excess in the physical stress exerted on the patient.

It is therefore the object of the present invention to provide a moving belt ergometer which requires only a relatively low electrical power connection for its operation and which nevertheless does not result in excess physical stress on the patient when the walking surface is inclined with respect to the horizontal.

SUMMARY OF THE INVENTION

The above object is accomplished according to the invention by providing the moving belt ergometer with a speed-controlled variable-speed motor which drives the moving belt and with a braking arrangement for the moving belt which is responsive to the force transmitted between the moving belt and the drive mechanism. In particular, the braking arrangement is actuated when the force transmitted between the moving belt and the drive mechanism is such that the moving belt is driving the drive mechanism. Although any type of force detecting and braking arrangements may be utilized, preferably dynamic braking of a DC shunt motor is utilized with the braking being responsive to and actuated by the counter EMF of the motor.

DESCRIPTION OF THE PREFERRED EMBODIMENTS

Figure 1:
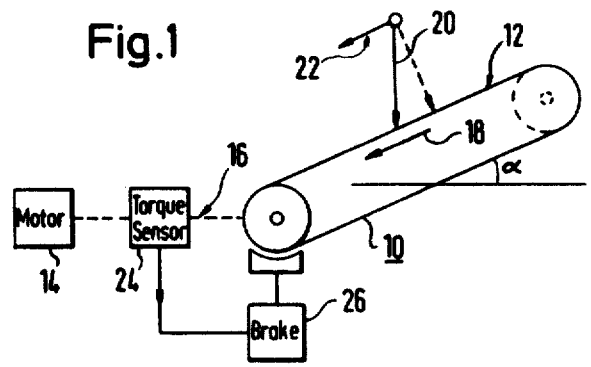
FIG. 1 is a very much simplified illustration of a moving belt ergometer illustrating the basic control elements according to the principle of the present invention.

Referring now to FIG. 1 there is schematically shown an endless moving belt 10 of a moving belt ergometer (not shown in detail), whose upper portion 12 forms a walking surface for the patient. The moving belt 10 is driven in the direction of arrow 18 by means of a speed-controlled variable-speed electromotor 14 and a gear mechanism 16 indicated by a dashed line.

As illustrated, the force 20 of the weight of the patient, e.g. a human being, produces a power component 22 in the driving direction when the walking surface 12 forms an angle α other than 0° with the horizontal. When the force 22 exceeds the frictional force of the system consisting of the moving belt 10 and the drive means 14, 16, the patient drives the moving belt 10 through his own power and consequently is then forced to walk faster and to expend more physical power than originally intended.

According to the present invention the expending of this undesired power by the patient is avoided by providing a sensing arrangement 24 which is responsive to the force being transmitted between the motor 14 and the belt 10 and determines whether the force is being transmitted from the motor 14 to the moving belt 10, indicating a normal operating state, or whether the force is being transmitted from the moving belt 10 to the motor 14, indicating an abnormal operating state. When the sensing device 24 detects that the force is being transmitted from the moving belt 10 to the motor 14, which, of course, is not desired since it indicates that the patient is driving the moving belt by his own force of gravity, the sensing device 24 actuates a braking device 26 which slows down the moving belt 10 and prevents undue speed thereof and physical stress on the patient.

The principle or basic concept of the invention explained in connection with FIG. 1 can be realized in various ways. For example, the sensing device 24 for determining the direction of force transmission between the motor 14 and the moving belt 10 can be a torque-sensitive device coupled to or connected in the transmission chain between the motor 14 and moving belt 10. Another possibility for sensing the direction of force transmission is to provide the stator of the motor 14 with a device which responds to the retroactive torque, e.g. a pressure box. Similarly, the brake device 26 may be a mechanical brake or an electrodynamic brake, as desired.

Figure 2:
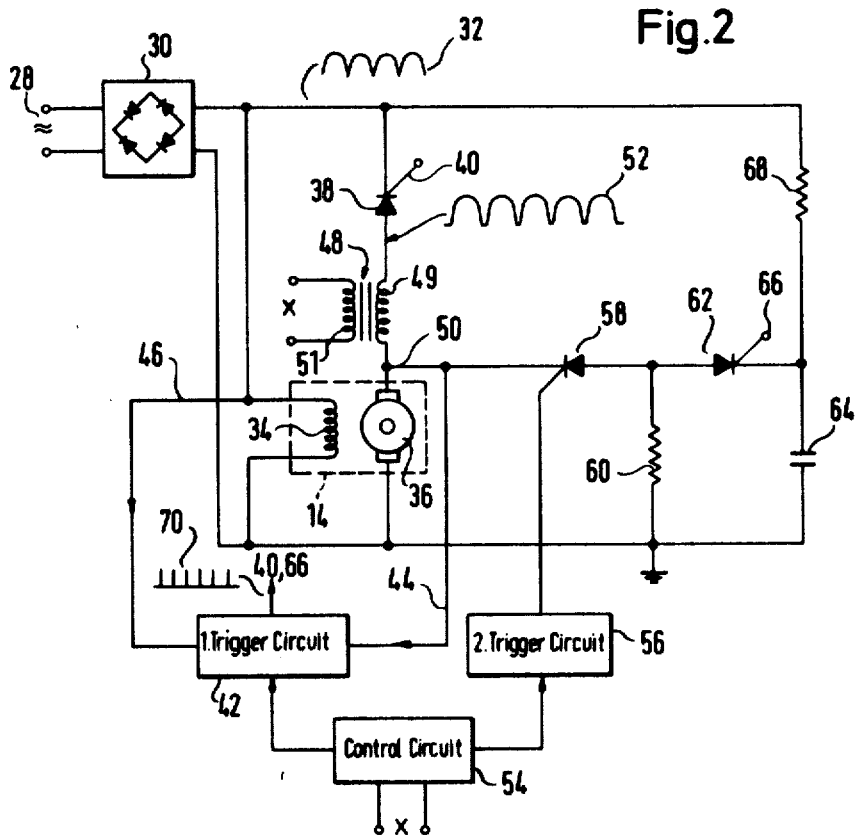
FIG. 2 is a circuit diagram illustrating the drive and braking arrangements for a moving belt ergometer according to one embodiment of the present invention.

FIG. 2 shows a preferred embodiment of the present invention in which the drive motor 14 serves not only to drive the moving belt 10 (not shown in FIG. 2) but also forms a portion of the sensing arrangement and braking device.

The drive power for the ergometer may be derived from a conventional AC outlet indicated by the reference numeral 28. The alternating line voltage is fed to a full-wave rectifier circuit 30 at whose output there appears a unipolar pulse-shaped voltage 32. The voltage 32 is fed directly to the field winding 34 and, via a thyristor 38, to the armature 36 of the electromotor 14 which is constructed as a DC shunt motor. The control or gate electrode 40 of thyristor 38 is connected to the output of a trigger circuit 42 which furnishes triggering pulses at the frequency of the pulse-shaped voltage 32, i.e. at twice the AC line frequency. In a manner well known in the art, the triggering circuit 42 contains known control circuitry for adjusting the output pulses therefrom to keep the speed of the electromotor 14 at a constant preset adjustable value. In order to provide this control, the armature voltage, i.e., the counter EMF, of motor 14 appearing at terminal 50, is fed as a control voltage to the triggering circuit 42 via a control line 44, and the synchronous-phase generation of the triggering pulses is assured by a connection 46 between the triggering circuit 42 and the output of the rectifier circuit 30. The complete circuit arrangement for regulating the speed of the motor in this manner is shown for example in Electronic Design, May 10, 1966, page 40 or in application note SMA 38 of the Radio Corporation of America "App. of RCA SGR's to speed control of universal motors" page 9 using unijunction transistors for triggering.

In order to determine whether motor 14 is driving or being driven by the moving belt 10, the primary winding 49 of a transformer 48 is connected in series with and between the thyristor 38 and armature 36 of motor 14. The voltage at the terminal 50 of the armature 36 consists of the conduction phase angle-controlled pulse voltage 52, which drives the motor 14, and the oppositely polarized counter EMF of the armature 36. When the counter EMF of the armature exceeds the drive voltage 52, which happens when the motor is driven by the moving belt, i.e., as a generator, no pulses flow through the primary winding 49 of transformer 48 and therefore no output voltage appears at the terminals $x$ of the transformer secondary winding 51. The secondary terminals $x$ are connected to the input and control the actuation of a control circuit 54 which may for example be a multivibrator circuit using unijunction transistor as triggering device see General Electric Appl. note 19.10 5/65 "The unijunction transistor characteristics and application" page 74 also Tex. Inst. Inc. book "-power seminar" page 194.

In the normal operation state, i.e. when the moving belt is driven by the motor 14, the thyristor 38 is periodically triggered by the period-triggering pulses 70 furnished by the first triggering circuit 42 and the motor is driven by the current flowing through armature 36. The speed is held at the preset value by the circuitry (not shown) provided in the first triggering circuit, with the regulation occurring through feedback of the counter EMF of the motor via line 44. This results in a control factor of approximately 1:10. The step resistance of the patient to be stressed is thus well compensated (e.g. 5 km./hr. ± 0.5 km./hr.).

However, when the patient drives the moving belt 10 and thus the motor 14, the counter EMF of the motor 14 appearing at terminal 50 will exceed the value of the pulse voltage 52 causing the pulse output at terminals $x$ to disappear. This disappearance of an output voltage at terminals $x$ causes the control circuit 54 to actuate the second triggering circuit 56 to furnish a direct triggering voltage to the control electrode of a thyristor 58 which is connected in series with a load resistor 60 and in parallel with the armature 36. The application of such a triggering pulse to thyristor 58 causes it to fire with the result that a braking armature current flows through this thyristor and resistor 60, resulting in dynamic braking of the motor 14 and hence moving belt 10.

Since the thyristor 58 when triggered will continue to conduct so long as it is properly biased, additional circuitry must be provided to extinguish it when braking is not required. In order to extinguish the thyristor 58, a further thyristor 62 is connected between the junction of the thyristor 58 and the resistor 60 and, via a resistance 68, the source of operating power, i.e., the output of rectifier 30. A capacitor 64 is connected between the junction of the thyristor 62 and the resistor 68 and the point of reference potential, e.g. ground. The control electrode 66 of thyristor 62 is fed by the output triggering pulses 70 from trigger circuit 42 and consequently is fired once during each voltage pulse 32. The firing of thyristor 62 consequently extinguishes thyristor 58 once during each voltage pulse 32, thereby allowing it to trigger again only when the motor is still being driven by the moving belt. The braking device thus responds very rapidly and can be applied to very accurate extents.

Motor 14 may be kept small in size and may be connected with the moving belt through a simple low-friction reduction gear mechanism having a fixed gear ratio, so that the driving power required for the apparatus can be taken without difficulty from a conventional, appropriately fused bipolar outlet.

It will be understood that the above description of the present invention is susceptible to various modifications, changes and adaptations, and the same are intended to be comprehended within the meaning and range of equivalents of the appended claims.

I claim:

1. In a moving belt ergometer for physically stressing a living being, said ergometer including a walking surface in the form of an endless moving belt which can be adjusted in its inclination with respect to the horizontal, and drive means including a speed-controlled variable-speed electromotor for driving said moving belts, the improvement comprising:
   a. brake means for applying a braking force to said moving belt; and
   b. means responsive to the direction of the force being transmitted between said belt and said drive means for actuating said brake means whenever said drive means is being driven by said moving belt as a result of a user-developed force which tends to drive said belt at a speed faster than that imparted by said drive means.

2. A moving belt ergometer as defined in claim 1 wherein said means for actuating said brake means is responsive to the counter EMF generated by said electromotor.

3. A moving belt ergometer as defined in claim 1 wherein said means for actuating said brake means is responsive to the torque acting on said electromotor.

4. A moving belt ergometer as defined in claim 1 wherein said brake means comprises means for electrically braking said electromotor.

5. A moving belt ergometer as defined in claim 4 wherein said electromotor is a DC shunt motor and wherein said brake means comprises a first thyristor connected in series with a load resistor and in parallel with the armature of said motor, and a first triggering circuit connected to the control electrode of said thyristor for producing an output pulse in response to a signal from said means for actuating said brake means.

6. A moving belt ergometer as defined in claim 5 wherein said drive means includes a second thyristor connected in series with said electromotor armature and a source of operating power for controlling the supply of operating power to said electromotor, and a second triggering circuit for periodically supplying triggering pulses to the control electrode of said second thyristor; and wherein circuit means for periodically extinguishing said brake means are provided including a third thyristor connected between the junction of said first thyristor and said load resistor, and said source of operating power, said third thyristor having its control electrode connected to the output of said second triggering circuit.

7. A moving belt ergometer as defined in claim 6 wherein said means for actuating said brake means comprises a transformer having its primary winding connected in series with and between said second thyristor and said armature of said DC motor, and its secondary winding connected to the input of a control circuit means, said control circuit means producing an output signal for actuating said first triggering circuit whenever the counter EMF of said DC motor exceeds the value of the DC voltage pulses from said source of operating power passing through said second thyristor, resulting in no output voltage appearing across the secondary winding of said transformer.

8. The ergometer as defined in claim 7 wherein said DC motor is connected to said moving belt via a simple reduction gear mechanism.